United States Patent
Gelman

(10) Patent No.: US 6,897,421 B2
(45) Date of Patent: May 24, 2005

(54) OPTICAL INSPECTION SYSTEM HAVING AN INTERNAL RANGEFINDER

(75) Inventor: Boris Gelman, Fairport, NY (US)

(73) Assignee: Optical Gaging Products, Inc, Rochester, NY (US)

( * ) Notice: Subject to any disclaimer, the term of this patent is extended or adjusted under 35 U.S.C. 154(b) by 83 days.

(21) Appl. No.: 10/373,069

(22) Filed: Feb. 26, 2003

(65) Prior Publication Data
US 2004/0164221 A1 Aug. 26, 2004

(51) Int. Cl.[7] .................. G02B 27/40; G02B 27/64; G02B 7/04
(52) U.S. Cl. .................. 250/201.2; 250/201.6; 250/559.24
(58) Field of Search .................. 250/201.2, 201.6, 250/559.29, 559.31, 559.38, 559.19, 559.22, 559.23

(56) References Cited

U.S. PATENT DOCUMENTS 6,091,075 A * 7/2000 Shibata et al. ......... 250/559.44

* cited by examiner

Primary Examiner—Thanh X. Luu
Assistant Examiner—Seung C. Sohn
(74) Attorney, Agent, or Firm—Shlesinger & Fitzsimmons

(57) ABSTRACT

An optical inspection system comprises an optical system for providing an image of an object being inspected. The optical system comprises a plurality of lenses arranged along a normal optical axis, one of the lenses including an objective lens. A collimated laser beam is directed to one edge portion of the objective lens toward the object to illuminate the object with a spot. A focus lens focuses the spot reflected from the object and transmitted through an opposite edge portion of said objective lens onto a linear detector, whereby the location of the spot on the linear detector provides the position of the object above or below a reference plane.

5 Claims, 3 Drawing Sheets

OPTICAL INSPECTION SYSTEM HAVING AN INTERNAL RANGEFINDER

FIELD OF THE INVENTION

The present invention relates generally to an optical inspection system for manufactured objects, particularly in regard to the determination of precise dimensional measurements of such objects.

OBJECT AND SUMMARY OF THE INVENTION

It is an object of the present invention to provide an optical inspection system with an internal laser triangulation rangefinder that uses the front objective lens of the optical system without interfering with the clear aperture of the lens.

The present invention provides an optical inspection system, comprising an optical system for providing an image of an object being inspected. The optical system comprises a plurality of lenses arranged along a normal optical axis, one of the lenses including an objective lens. A collimated laser beam is directed to one edge portion of the objective lens toward the object to illuminate the object with a spot. A focus lens focuses the spot reflected from the object and transmitted through an opposite edge portion of said objective lens onto a linear detector, whereby the location of the spot on the linear detector provides the position of the object above or below a reference plane.

The system further includes a beam splitter disposed behind the objective lens to direct the laser beam toward one edge portion of the objective lens toward the object and to direct the reflected light transmitted through the opposite edge portion of the objective lens object to the focus lens and thence to the linear detector.

Instead of the beam splitter, the system may include a first mirror disposed behind the one edge portion of the objective lens to direct the laser beam to the one edge portion of the objective lens toward the object; and a second mirror disposed behind the opposite edge portion of the objective lens, to direct light reflected from the object created by the spot and transmitted through the opposite edge portion of the objective lens to the focus lens and thence onto the linear detector.

These and other objects of the present invention will become apparent from the following detailed description.

BRIEF DESCRIPTIONS OF THE DRAWINGS

DETAILED DESCRIPTION OF THE INVENTION

Figure 1:
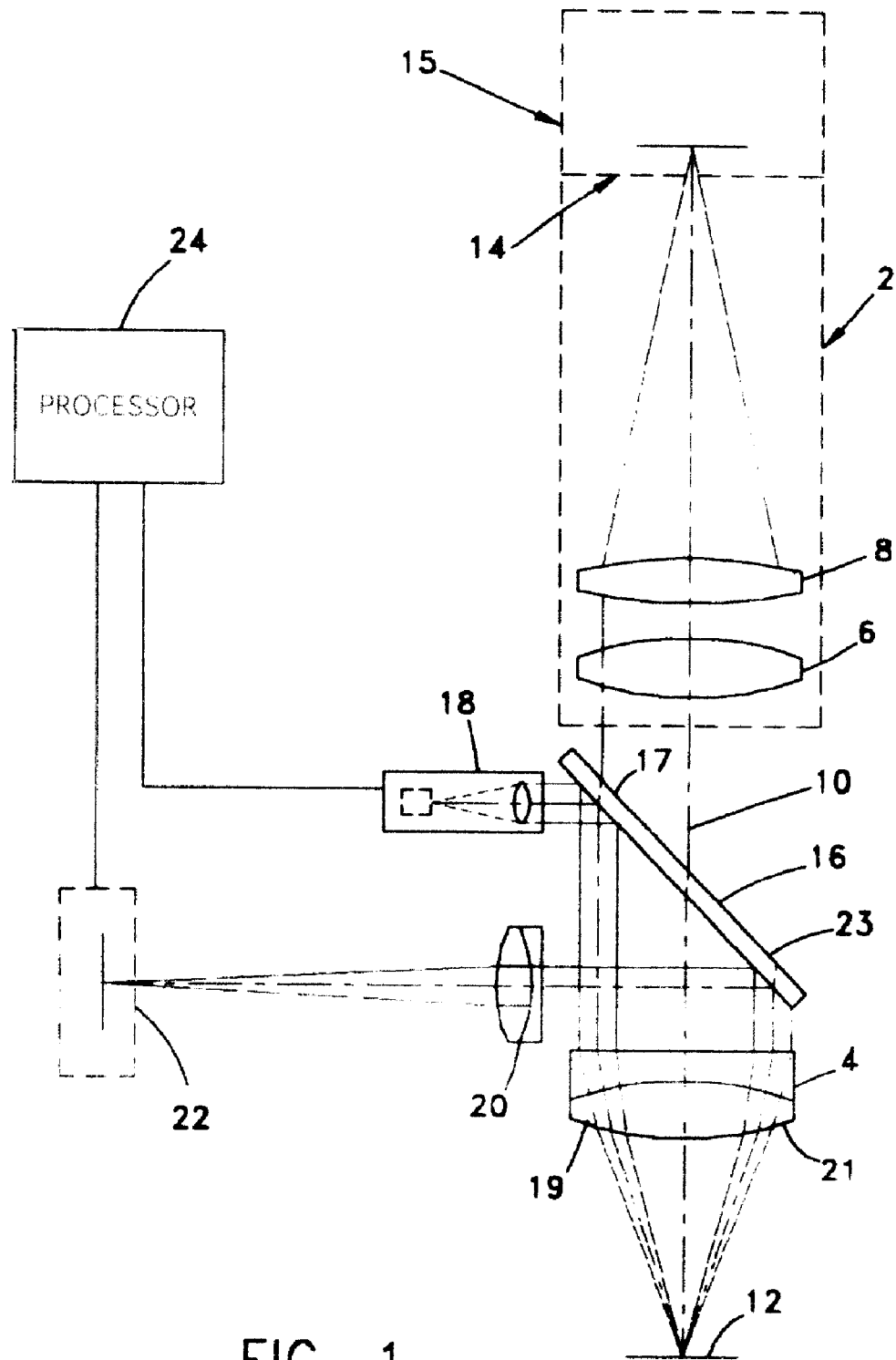
FIG. 1 is a schematic diagram of an optical inspection system including an internal rangefinder made in accordance with the present invention.

An optical system 2, such as that disclosed in U.S. Pat. No. 6,292,306, is schematically shown in FIG. 1. The system 2 includes a front objective lens 4 and lenses 6 and 8, all of which are aligned along an optical axis 10 to focus on an object lying on an object plane 12 and create an image on an image plane 14 of a camera 15. A beam splitter 16 is disposed behind the objective lens 4. Light from a collimated laser 18 is directed from an edge portion 17 of the beam splitter 16 to an outer edge portion 19 of the objective lens 4 in a path parallel to the optical axis 10. The objective lens 4 bends the light onto the object plane 12, producing a spot which is reflected at an angle to an opposite edge portion 21 of the objective lens 4 and emerges therefrom parallel to the optical axis 10 and is reflected from an edge portion 23 of the beam splitter 16 to a focus lens 20, which directs the reflected light onto a linear detector 22. A processor 24 controls the linear detector 22 and the laser 18. The linear detector 22 is a light detection device that, in conjunction with the processor 24, can determine the spot lateral location, and thus the actual object surface height. The system comprising the objective lens 4, the focus lens 20, the linear detector 22, the laser 18 and the processor 24 is a rangefinder. U.S. Pat. No. 4,891,772, which is incorporated herein by reference, discloses a laser based rangefinder.

The collimated laser beam is reflected off the beam splitter 16 so that it intersects the front objective lens 4 parallel to the optical axis 10, but disposed laterally to one side of the axis. The beam is then brought to focus by the objective lens 4 at the center of the object plane 12. The laser beam forms a spot on the object's surface at the center of the field when the object is at the nominal or reference height. The spot moves laterally of the optical axis 10 when the object intersects the beam above or below the object plane 12. To observe the spot, the focusing lens 20 is used to form an image on the linear detector 22. The focusing lens beam works off the beam splitter 16 and through the objective lens 4, much like the laser beam projection in reverse, but from the other side of the optical axis 10. Light from the spot projected unto and reflected off the object enters the objective lens 4, which produces an essentially collimated beam that is brought to focus at the linear detector 22 by the focus lens 20. The reflected beam is displaced laterally to the other side of the optical axis 10, thereby increasing the angle between the projection and observation directions to facilitate measurement of the spot excursion corresponding to the object height variations.

It should be understood that the system 2 uses the front objective lens of a standard optical system to focus the laser beam and as an imaging element in the spot observation path. The beam splitter 16 advantageously separates the height measurement components from the optical system so as not to interfere with its functioning.

Figure 2:
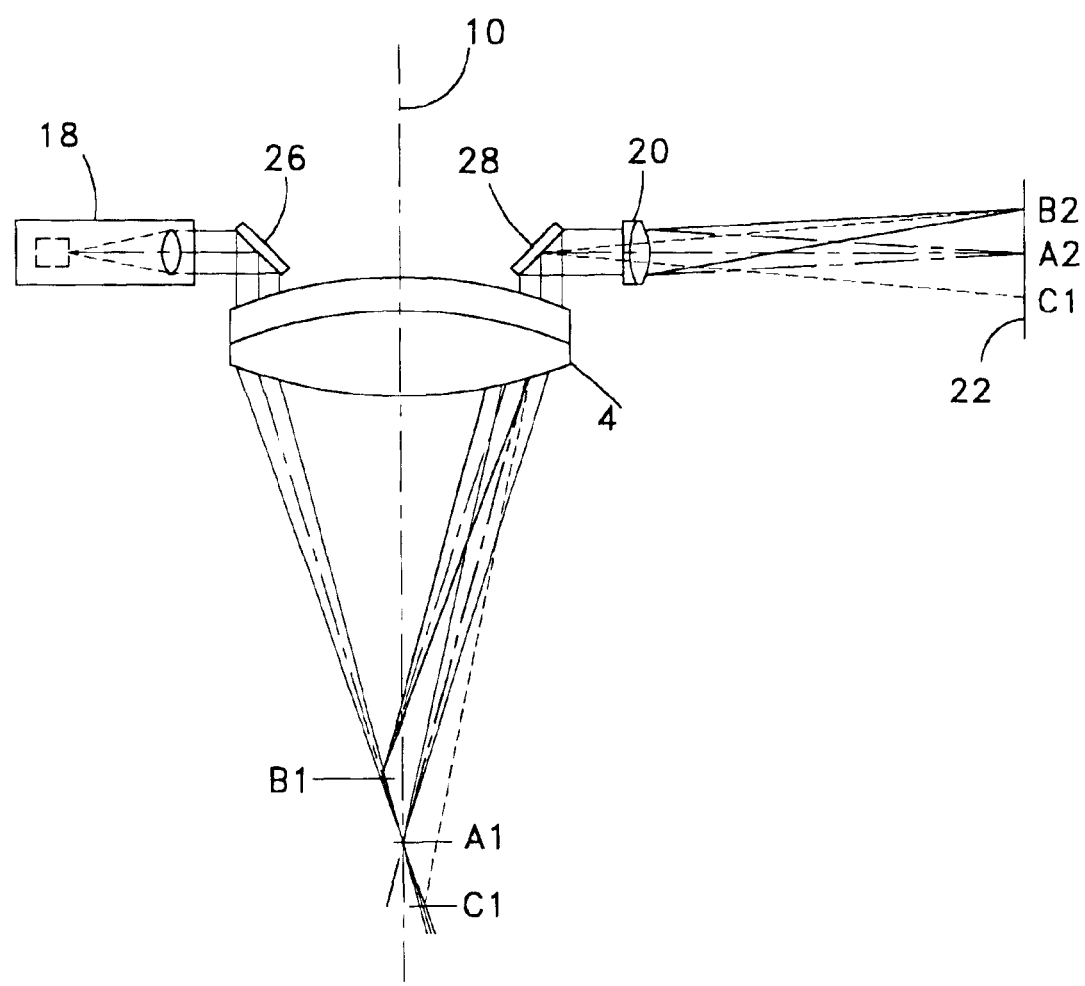
FIG. 2 is a schematic diagram of another embodiment of the present invention using a pair of mirrors in lieu of a beam splitter.

Another embodiment of the present invention is disclosed in FIG. 2. In lieu of the beam splitter 16, a pair of small mirrors 26 and 28 are used in the projection and observation paths to allow the laser 18 and the linear detector 22 to be located clear of the aperture of the objective lens 4. The mirrors 26 and 28 merely serve to mechanically and conveniently locate the components.

The beam splitter 16 and the mirrors 26 and 28 provide the means for directing the laser beam to one edge portion of the objective lens 4 toward the object to illuminate it with a spot and for directing the light reflected from the spot onto the linear detector 22.

Referring to FIG. 2, when the object surface is located in the nominal object plane, a spot A1 produced by the laser 18 is imaged onto the center of the linear detector at point A2. If the surface is higher then the nominal plane 12, a spot B1 produced by the laser beam is shifted towards the left, relative to the normal optical axis 10, and an image B2 of the spot B1 is shifted even further when viewed by the off-axis observation path. Similarly, when the object surface is lower than the nominal object plane 12, a spot C1 is shifted to the right and the resulting image C2 on the linear detector shifts in the opposite direction of B2. Although there is some de-focusing of the projected laser spot and its image on the detector 22 tends to curve when the object is not at the nominal object plane, it still sufficiently defined to enable the determination of the displacement of the laser spot from the nominal object plane.

Figure 3:
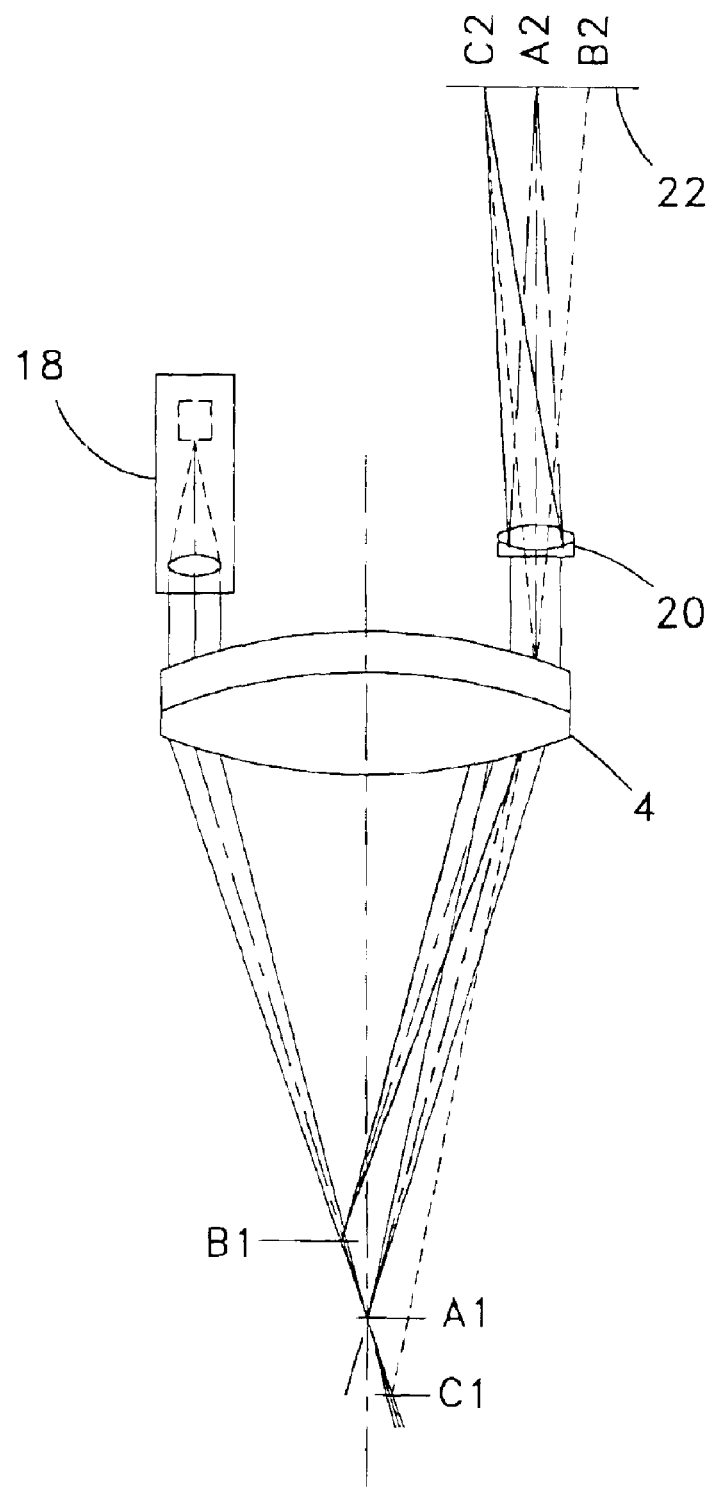
FIG. 3 is a schematic diagram of another embodiment of the present invention without using a beam splitter or mirrors.

It should be understood that an oversized objective lens 4 would be able to accommodate the laser 18 and the linear detector 22 disposed directly behind the objective lens without the use of the beam splitter 16 or the mirrors 26 and 28, as shown in FIG. 3. The objective lens 4 must be large enough in order to not interfere with the clear aperture of the lens. The operation of the rangefinder is the same as the embodiment described in FIG. 2, except that the mirrors 26 and 28 have been deleted.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An optical inspection system, comprising:
    a) an optical system for providing an image of an object being inspected, said optical system comprising a plurality of lenses arranged along a normal optical axis, one of said lenses including an objective lens;
    b) a collimated laser beam directed to one edge portion of said objective lens toward the object to illuminate the object with a spot;
    c) a linear detector;
    d) a focus lens to focus the spot reflected from the object and transmitted through an opposite edge portion of said objective lens onto said linear detector, whereby the location of the spot on said linear detector provides the position of the object above or below a reference plane.

2. An optical inspection system as in claim 1, and further comprising:
    a) a beam splitter disposed behind said objective lens;
    b) said laser beam is directed toward one edge portion of said beam splitter such that the reflected beam is redirected to said one edge portion of said objective lens toward the object; and
    c) light reflected from the object created by the spot is redirected from said opposite edge of said objective lens via an opposite edge portion of said beam splitter to said focus lens and thence onto said linear detector.

3. An optical system as in claim 1, and further comprising:
    a) a first mirror disposed behind said one edge portion of said objective lens, said first mirror being positioned to direct said laser beam to said one edge portion of said objective lens toward the object; and
    b) a second mirror disposed behind said opposite edge portion of said objective lens, said second mirror being positioned to direct light reflected from the object created by the spot and transmitted through said opposite edge portion of said objective lens to said focus lens and thence onto said linear detector.

4. An optical inspection system as in claim 1, wherein said optical system includes a camera for creating an image of the object being inspected.

5. An optical inspection system, comprising:
    a) an optical system comprising a plurality of lenses arranged along an optical axis, one of said lenses including an objective lens;
    b) a camera operably associated with said optical system for creating an image of an object being inspected;
    c) a source for generating a laser beam;
    d) a linear detector; and
    e) means for directing the laser beam to one edge portion of said objective lens toward the object to illuminate the object with a spot and for directing the light reflected from the spot onto said linear detector, whereby the location of the spot on said linear detector provides the position of the object above or below a reference plane.

* * * * *